Patented July 17, 1923.

1,462,306

UNITED STATES PATENT OFFICE.

ARCHIBALD D. ST. JOHN, OF MAPLEWOOD, NEW JERSEY.

PLASTICISER FOR CELLULOSE PLASTICS.

No Drawing.  Application filed May 22, 1922. Serial No. 562,813.

*To all whom it may concern:*

I, ARCHIBALD D. ST. JOHN, a citizen of the United States, and a resident of the town of Maplewood, county of Essex, and State of New Jersey, have invented a new and Improved Plasticiser for Cellulose Plastics, of which the following is a full, clear, and exact description.

My invention relates to a solvent for cellulose esters and particularly to organic phosphates used for the purpose.

At present triphenylphosphate and tricresyl phosphate are the best known and most widely used. Of the two mentioned, tricresylphosphate is liquid at ordinary temperature and is therefore used in preference to the triphenylphosphate for some purposes.

The raw material for tricresylphosphate is cresol, a natural product, which is less pure and more expensive than phenol. If therefore, triphenylphosphate were liquid it would be preferable to tricresylphosphate, and more economical from a manufacturing standpoint.

I have found, by experiment, that I can produce a mixed phenyl-cresylphosphate containing one or more molecules of cresol and of phenol, one of which possesses the physical advantages of tricresylphosphate, with as easy a purification and cheapness of raw material as triphenylphosphate. By mixed is meant that the phosphate radical is in combination with both phenyl and cresyl radicals. The solvent which has substantially the property of tricresylphosphate is supposed to be mono-cresyl-di-phenylphosphate and may be prepared by mixing one molecular weight of ortho cresol with two molecular weights of phenol to obtain a homogeneous solution; then treating the mixture with one molecular weight of phosphorous pentachloride, the result being a mixed cresyl-phenyl phosphite chloride. An addition of water decomposes the substance with the evolution of hydrogen chloride, the result of the reaction being the substance, the mono-cresyl-di-phenyl phosphate. It may be purified by washing with water and dilute alkali solution.

My plasticiser has a probable structure of

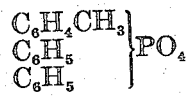

and is liquid at ordinary temperature. It boils at atmospheric pressure at about 400 degrees C, with not more than slight decomposition of the substance.

My plasticiser can be used in the same way as plasticisers hitherto known have been used and the amount of cellulose esters to be added will vary according to whether it is used in celluloid, lacquer, artificial leather or similar article. In general, it may be stated that from 20% to 35% of the substance in my disclosure can be mixed with 80 to 65% of the cellulose esters, and can also be used in conjunction with cellulose esters softened with camphor, or, in place of camphor, triphenylphosphate or other solvents; in which case, the proportion of my solvent will vary.

I claim:

1. As a new plasticiser, a mixed cresyl-phenylphosphate.

2. As a new plasticiser, mono-cresyl-di-phenylphosphate.

3. As a new plasticiser, mono-cresyl-di-phenylphosphate, liquid at normal temperature and pressure.

4. A plasticiser, a mixed cresyl-phenyl-phosphate, liquid at normal temperature and pressure.

5. A plasticiser, a compound, the probable structure of which is

and a liquid at ordinary temperature which boils with not more than slight decomposition at atmospheric pressure at about 400 degrees C.

ARCHIBALD D. ST. JOHN.